(12) United States Patent
Gerligand et al.

(10) Patent No.: US 10,151,935 B2
(45) Date of Patent: Dec. 11, 2018

(54) TRUNCATED TRANSLATING CONTACT LENS WITH OPTIMIZED PERFORMANCE AND METHOD OF DESIGN

(71) Applicant: Johnson & Johnson Vision Care, Inc., Jacksonville, FL (US)

(72) Inventors: Pierre-Yves Gerligand, St. Johns, FL (US); Gregory J. Hofmann, Jacksonville Beach, FL (US); Philippe F. Jubin, Fernandina Beach, FL (US); Shahrokh Zeinali-Davarani, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 15/848,178

(22) Filed: Dec. 20, 2017

(65) Prior Publication Data

US 2018/0113324 A1 Apr. 26, 2018

Related U.S. Application Data

(62) Division of application No. 14/942,298, filed on Nov. 16, 2015, now Pat. No. 9,880,399.

(51) Int. Cl.
*G02C 7/02* (2006.01)
*G02C 7/04* (2006.01)

(52) U.S. Cl.
CPC .............. *G02C 7/043* (2013.01); *G02C 7/028* (2013.01); *G02C 7/048* (2013.01)

(58) Field of Classification Search
CPC .......... G02C 7/048; G02C 7/02; G02C 7/043; G02C 7/04; G02C 11/08; G02C 1/02; G02C 7/041; G02C 7/047; G02C 7/049; G02C 7/086; G02C 7/16; G02C 7/046;
(Continued)

(56) References Cited

U.S. PATENT DOCUMENTS 4,549,794 A 10/1985 Loshaek
4,618,229 A 10/1986 Jacobstein
4,850,689 A 7/1989 Martin
(Continued)

FOREIGN PATENT DOCUMENTS

EP 1901108 A1 3/2008
WO WO2001075509 A1 10/2001
WO WO2005106570 A1 11/2005

OTHER PUBLICATIONS

Search Report from corresponding SG Appln. No. 10201609454R dated Jun. 28, 2018.
(Continued)

*Primary Examiner* — Thomas K Pham
*Assistant Examiner* — Sharrief I Broome
(74) *Attorney, Agent, or Firm* — Carl J. Evens

(57) ABSTRACT

Translating contact lenses which are truncated for correcting presbyopia and whose design is optimized to maximize translation ability while maintaining comfort when the lens is worn on eye. Truncation of the lenses results in a non-round geometry while still retaining under-lid residency in select portions of the lens itself. Maximum thickness and back surface radius of curvature along with ramp shape can be optimized individually or in combination to maximize translation of the lens relative to the eye, when the lens is positioned on eye.

3 Claims, 15 Drawing Sheets

(58) Field of Classification Search
CPC ............... G02C 11/12; G02C 2200/08; G02C 2202/08; G02C 3/003; G02C 7/044; G02C 7/08
USPC .... 351/159.36, 159.19, 159.73, 159.74, 152, 351/158, 159.41
See application file for complete search history.

(56) References Cited

U.S. PATENT DOCUMENTS

| | | | |
|---|---|---|---|
| 5,606,378 | A | 2/1997 | Van Meurs |
| 5,968,422 | A | 10/1999 | Kennedy |
| 6,109,749 | A | 8/2000 | Bernstein |
| 6,241,355 | B1 | 6/2001 | Barsky |
| 6,746,118 | B2 | 6/2004 | Mandell |
| 6,921,168 | B2 | 7/2005 | Lindacher |
| 7,052,132 | B2 | 5/2006 | Ezekiel |
| 7,216,978 | B2 | 5/2007 | Perez |
| 7,430,930 | B2 | 10/2008 | Zeller |
| 7,543,935 | B2 | 6/2009 | Ezekiel |
| 7,810,925 | B2 | 10/2010 | Evans |
| 2001/0028434 | A1 | 10/2001 | Carter |
| 2004/0233382 | A1 | 11/2004 | Lindacher |
| 2010/0079724 | A1* | 4/2010 | Pugh ................ B29D 11/00009 351/159.75 |
| 2012/0075579 | A1 | 3/2012 | Roffman |
| 2012/0075581 | A1* | 3/2012 | Roffman ................ G02C 7/043 351/159.41 |
| 2013/0077045 | A1 | 3/2013 | Gerligand |
| 2013/0258274 | A1 | 10/2013 | Wildsmith |

OTHER PUBLICATIONS

Lira M. et al. Importance of contact lens power and thickness in oxygen transmissibility. Contact Lens & Anterior Eye. vol. 38, No. 2, pp. 120-126. Apr. 2015.

\* cited by examiner

FIG. 3A

| Max Thickness | 0.4 mm | | | | | | | | | | | |
|---|---|---|---|---|---|---|---|---|---|---|---|---|
| Periph. Back Curve | Rmin = 8.4 ; Req = 8.6 | | | Rmin = 8.6 ; Rmax = 8.8 | | | Rmin = 8.0 ; Req = 8.6 | | | Rmin = 8.6 ; Rmax = 9.2 | | |
| Back Curve Trans Angle | $\beta_1$ = 120deg ; $\beta_2$ =240deg | | | $\beta_1$ = 150deg ; $\beta_2$ =210deg | | | $\beta_1$ = 120deg ; $\beta_2$ =240deg | | | $\beta_1$ = 150deg ; $\beta_2$ =210deg | | |
| Ramp Shape | Conv | Linear | Conc | Conv | Linear | Conc | Conv | Linear | Conc | Conv | Linear | Conc |
| Design # | 1 | 2 | 3 | 4 | 5 | 6 | 7 | 8 | 9 | 10 | 11 | 12 |

| Max Thickness | 0.6 mm | | | | | | | | | | | |
|---|---|---|---|---|---|---|---|---|---|---|---|---|
| Periph. Back Curve | Rmin = 8.4 ; Req = 8.6 | | | Rmin = 8.6 ; Rmax = 8.8 | | | Rmin = 8.0 ; Req = 8.6 | | | Rmin = 8.6 ; Rmax = 9.2 | | |
| Back Curve Trans Angle | $\beta_1$ = 120deg ; $\beta_2$ =240deg | | | $\beta_1$ = 150deg ; $\beta_2$ =210deg | | | $\beta_1$ = 120deg ; $\beta_2$ =240deg | | | $\beta_1$ = 150deg ; $\beta_2$ =210deg | | |
| Ramp Shape | Conv | Linear | Conc | Conv | Linear | Conc | Conv | Linear | Conc | Conv | Linear | Conc |
| Design # | 13 | 14 | 15 | 16 | 17 | 18 | 19 | 20 | 21 | 22 | 23 | 24 |

FIG. 3B

Additional design variations corresponding to designs 3 and 9 for pairwise comparison:

| | var of 3 | var of 9 | var of 3 | var of 3 | var of 3 | Equiv. 156 | var of 3 | var of 3 | var of 9 | var of 9 |
|---|---|---|---|---|---|---|---|---|---|---|
| Slope (Sup. To Inf.) | 2.27 | 2.27 | 2.27 | 2.27 | 2.27 | 2.27 | 1 | 6 | 1 | 6 |
| Max Thickness | 0.3 | 0.3 | 0.4 | 0.4 | 0.4 | 0.4 | 0.4 | 0.4 | 0.4 | 0.4 |
| Periph. Back Curve | Rmin 8.4 | Rmin 8 | uni R 8.4 | uni R 8.8 | uni R 9.2 | uniR 9.07 | Rmin 8.4 | Rmin 8.4 | Rmin 8 | Rmin 8 |
| Back Curve Trans Angle | $\beta_1$ = 120deg ; $\beta_2$ = 240deg | | | | | | | | | |
| Ramp Shape | Concave | | | | | | | | | |
| Design # | 25 | 26 | 27 | 28 | 29 | 30 | 31 | 32 | 33 | 34 |

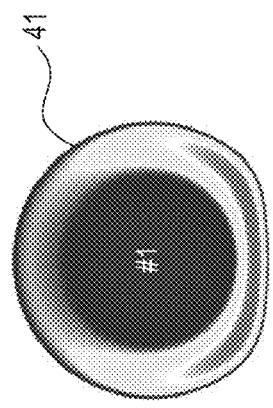
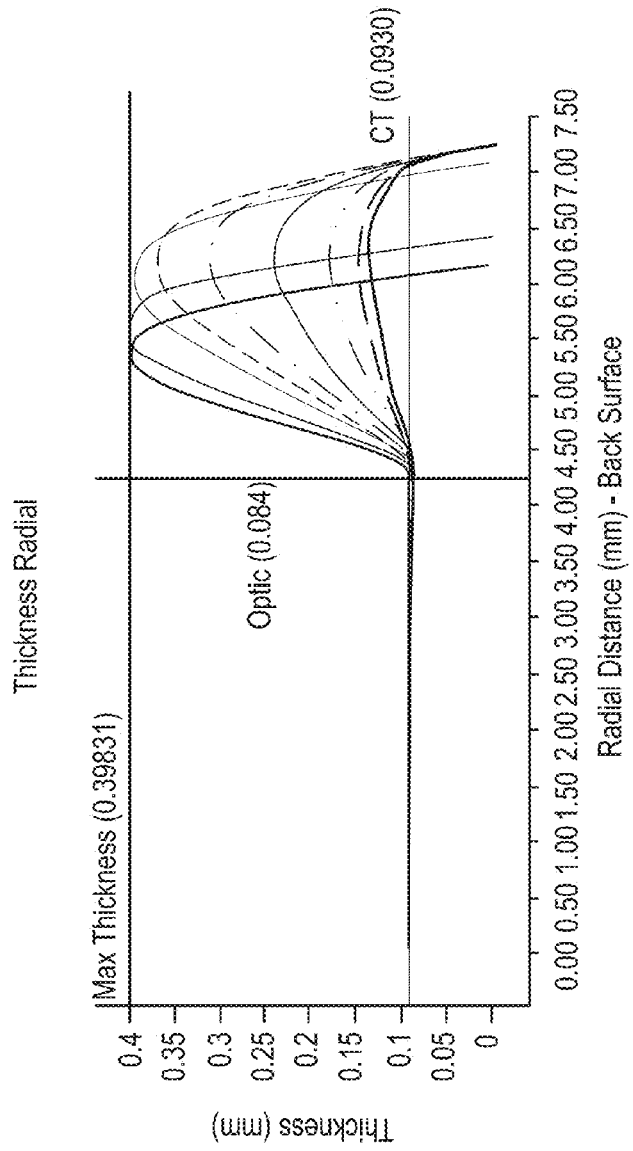
FIG. 4A

FIG. 4B
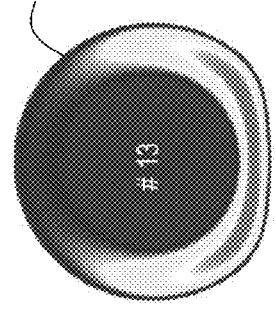
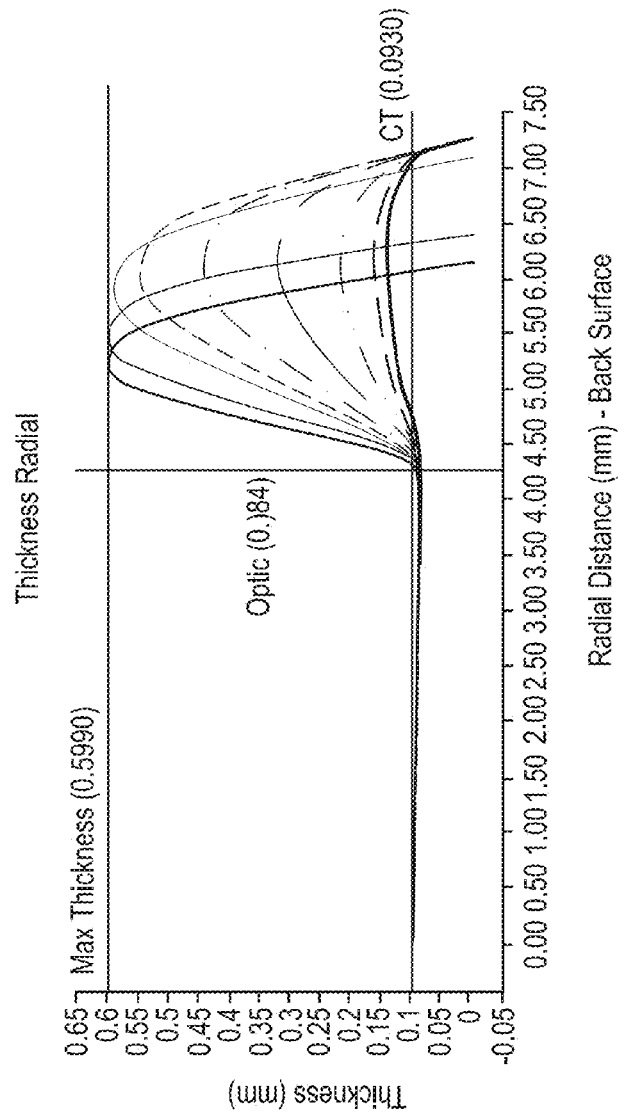

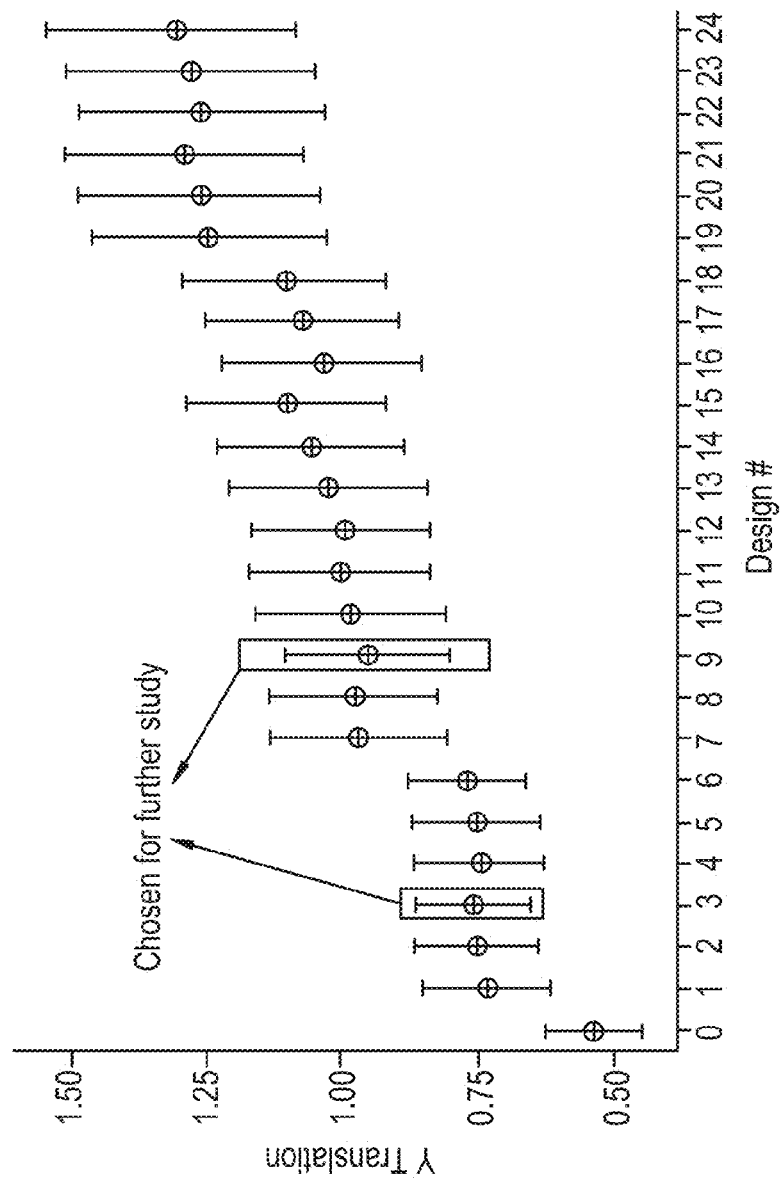

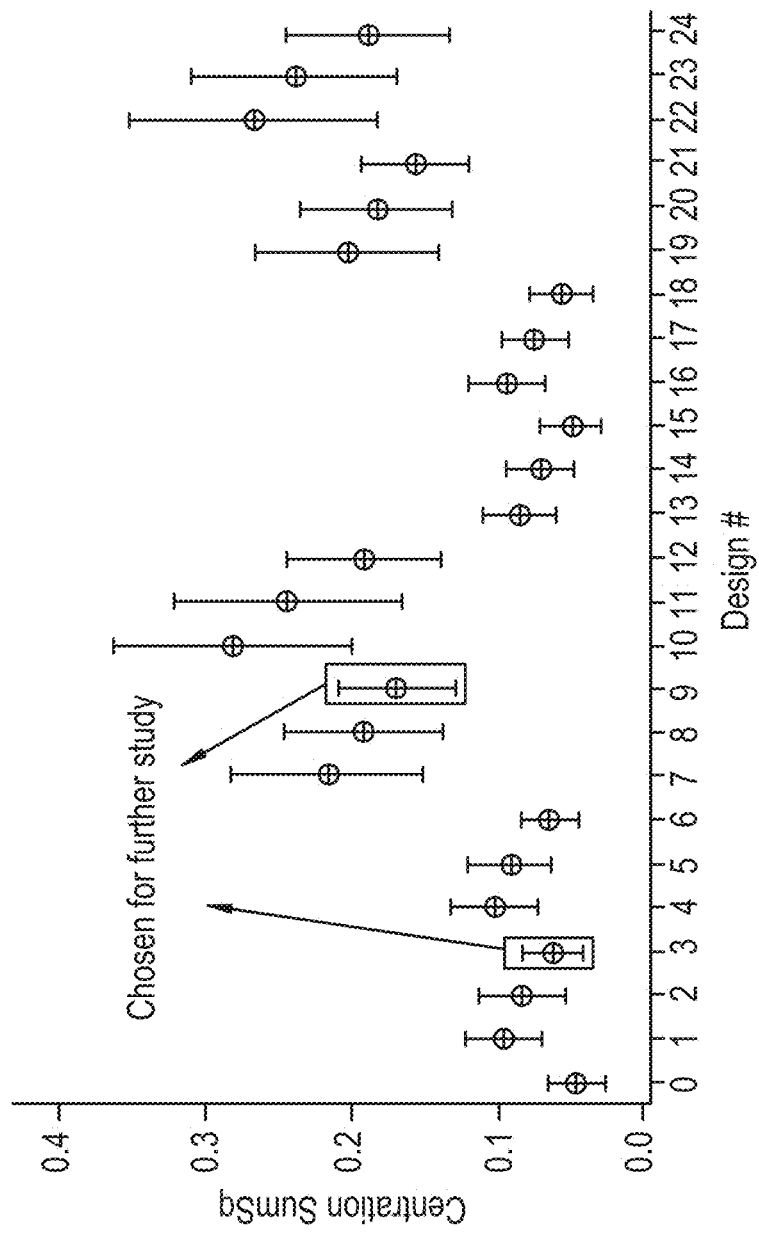

TRUNCATED TRANSLATING CONTACT LENS WITH OPTIMIZED PERFORMANCE AND METHOD OF DESIGN

This application is a division of U.S. patent application Ser. No. 14/942,298 filed on Nov. 16, 2015.

BACKGROUND OF THE INVENTION

1. Field of the Invention

The present invention relates to ophthalmic lenses, and more particularly to the design of translating contact lenses which are truncated for correcting presbyopia and whose design is optimized to maximize translation ability while maintaining comfort when the lens is worn on eye.

2. Discussion of the Related Art

Contact lenses are considered medical devices and may be worn to correct vision and/or for cosmetic or other therapeutic reasons. Contact lenses have been utilized commercially to improve vision since the 1950s. Early contact lenses were made or fabricated from hard materials, and were relatively expensive and fragile. Although these contact lenses are still utilized, they are not suitable for all patients due to their poor initial comfort. Later developments in the field gave rise to soft contact lenses, based upon hydrogels, which are extremely popular and widely utilized today. The introduction of soft contact lenses has significantly improved the comfort experienced by the wearer.

As a person ages, the crystalline lens gradually becomes more rigid, and thus their eyes are less able to accommodate. Said another way, our eye muscles ability to alter the shape of the natural human crystalline lens to focus on near objects is diminished as we age. This condition is known as presbyopia. In treating presbyopic patients, one innovation is the use of translating lens designs. Two of the more popular types of translating lens designs can be of the truncated variety or the pseudo-truncated variety with the primary difference between the two being the overall lens shape and how the inferior portion of the lens interacts with the eyelids to achieve translation of the lens relative to the pupil. The typical translating lens relies on the relative movement of the contact lens relative to the eye, specifically the pupil. Typically the translating lens will have multiple optical zones, but unlike a typical concentric bifocal, where the vision correction zones are annular regions concentrically located, in the translating bifocal, the vision correction zones are located in upper and lower positions. At a minimum, both a near and far vision correction zone would be present in the lens to account for the loss of the patients ability to accommodate, and depending on the angle of gaze, one can optimize vision by directing the gaze through one zone or the other. To accomplish this, the near and far zones are generally placed inferior and superior respectively. As an example, as one looks downward (typically for near vision needs such as reading) they are looking through the lower (near) portion of the lens. This is successful because the lens, through interaction with the lower eyelid, is typically driven upward, relative to the pupil, whose angle of gaze is being directed downward. As their gaze returns to a more horizontal position and the lens wearer looks to objects in the distance, the relative position of the lens is such that the pupil of the eye is now aligned with looking through the superior (far) portion of the lens. This results in optimizing the focus for both near and far vision needs. The incorporation of one or more intermediate zones between the near and far zones may also be present to facilitate intermediate vision needs such as computer viewing.

Thus to achieve optimal vision for the multiple vision needs, it is essential to achieve the necessary movement of the translating lens relative to the eye for a translating lens to function correctly. Not achieving this may result in the gaze being directed through the wrong zone or a portion of both zones and thus resulting in blurred vision. One of the early concepts in this space is discussed in U.S. Pat. No. 6,109,749, in which the innovators incorporated an integrally formed bevel that provided for a type of buttress or protrusion from the anterior lens surface to interact with the eye-lid in order to aid in translating the lens relative to the eye itself. With the issue of comfort put aside for the time being, while the approach of lens interaction with the lower eyelid is indeed viable, the extent of the relative translation of the lens may be impacted by a number of items including but not limited to the quality and presence of the tear film, lens fit, lens design, and the asymmetry of the eye and how it interacts with the contact lens thus impacting, or in some cases not allowing, the desired result to be achieved.

In U.S. Pat. No. 6,746,118, which also attempts to achieve vertical lens movement, the innovator suggests that the dual nature of the secondary prism is an improvement over the '749 patent accomplished by achieving a secondary power in addition to facilitating the vertical shifting of the lens. But this issue is a bit more complicated than that as there are other factors that neither the '749 or the '118 patent consider, for example, U.S. Pat. No. 7,216,978 illustrates that the upper and lower eyelids do not move strictly in a vertical direction during blinking. Rather, the upper lid moves substantially vertically, with a small nasal component during blinking, and the lower lid moves substantially horizontally, moving nasal-ward during blinking. Given the primarily horizontal movement of the lower lid, one may question its extent of contribution to vertical lens translation; at best it can only serve as a stop to prevent the lens from moving downward. Additionally, the upper and lower eyelids are not symmetrical with respect to a plane cutting though the vertical meridian. In other words, individuals do not blink symmetrically relative to a horizontal axis drawn between the open upper and lower lid. This, at a minimum, may have an impact to the required vertical translation of the lens that these innovators are all trying to achieve. Accordingly, blinking in of itself may not be the only leveragable item in the ideal translation of the contact lens thus presenting yet another opportunity to improve upon the design in order to maximize the extent of lens translation.

Another aspect related to blinking, which may come into play when one is dealing with maintaining comfort, is the presence of mechanical receptors in both the upper and lower eyelids. While it is not fully known whether there are differences in the sensitivity of the receptors in the upper or lower eyelids, what is known is that the distance travelled by the upper eye-lid is greater than that of the lower eyelid during a blink. Given that these mechanical receptors respond to changes in stress, smoother and less abrupt changes in geometry will likely perform better than those designs with abrupt changes in geometry. Since the distance travelled by the upper eyelid is greater, it is probable that its mechanical receptors are more likely to encounter increased opportunities to respond to changes. All things being equal, given the greater duration of the lens-lid interaction with the upper eyelid, it follows that one may want to consider the upper eyelid's interaction with the lens equally, if not more so, than that of the lower eyelids interaction. Additionally, the nature of a soft contact lens as compared to a hard contact lens, may also impede the ability of the soft contact lens to translate effectively given it is more likely to conform to the shape of the cornea. Consideration of the shape of the posterior surface of the lens and how this may impact lens translation can be extremely important and is something the previous innovators in this space have not addressed in combination with translating lens concepts.

In the truncated translating lens design the lower portion of the truncated contact lens is flattened by cutting off or shortening that part of the lens resulting in a non-circular lens. The conventional truncated translating lens design results in a substantially flat, thick edge at the bottom of the lens. The intent being that this flattened portion interacts with the lower eye-lid to achieve translation by the lid serving as a positive mechanical stop when it interacts with the bottom of the lens. Exemplary descriptions of such lenses are set forth in a number of patents, including U.S. Pat. No. 7,543,935, U.S. Pat. No. 7,430,930, U.S. Pat. No. 7,052,132, and U.S. Pat. No. 4,549,794. However, a relatively flat edge on contact lenses such as these may tend to influence comfort. An alternative approach which leverages the concept of a minimum energy position is that which is provided in U.S. Pat. No. 7,810,925, in which a lens design with two discrete stability positions is suggested to optimize lens position for near and distance vision needs. This concept of minimum potential energy position may be leveraged to achieve these two stability positions. However, given that some level of displacing force (potentially a significant level in the '925 patent case) is required to move from one position to the other, it's likely that some level of discomfort is also being introduced for the initial stability position to be overcome in order to move to the second stability position. Comfort can be as, if not more, important that achieving the desired displacement of the lens.

Innovators have also attempted to use a pseudo-truncated design for a translating lens design. In the pseudo-truncated translating lens approach, the lens remains circular, but through localized thickness changes a pseudo truncation zone is created that interacts with the eyelid to achieve the desired translation of the lens through interaction with the eyelids. One such example is shown in U.S. Pat. No. 6,921,168. In the '168 patent a ramped ridge zone located in the inferior portion of the lens and is positioned below the optical zone. The ramped ridge zone of the lens is intended to remain underneath the lower lid. The lens also includes what they call a ridge-off zone which is located medially, laterally and superiorly in the peripheral region of the lens, essentially everywhere else the ramp ridge zone is not. It is the intent of the innovators that the lower eyelid of the eye is engaged with at least some portion of the ramped ridge at all times. It is this interaction between the lower eyelid and the lens that the innovators of the '168 patent claim how the desired translation of the lens is achieved. The '168 patent attempts to improve comfort by attempting to design the ramped rigid zone to better conform to the lower eyelid. While these innovators speak to the need to conform to the lower eyelid and gradually engage the lower eyelid which is achieved by the presence of the ramped ridge zone, no consideration is given to placement and extent of the ramped rigid zone itself which is fairly localized in the inferior region alone. While the innovators of the '168 patent discuss the posterior surface of the lens containing an optical zone, no attention or discussion is given to the posterior surface or shape of the lens as it relates to lens translation. Additionally, no mention of the impact of how the upper eyelid interacts with the ridge-off zone region and its impact to translation and comfort is provided.

In US Published Patent Application Numbers 2012/0075579 and 2012/0075581, whose assignee is also the assignee of applicants' present invention, a translating lens for correcting presbyopia having a pseudo-truncation is provided. In this case, the pseudo truncation is asymmetric with respect to the vertical meridian, specifically the pseudo-truncation is biased in the inferior and nasal directions which more closely corresponds and is aligned to how our gaze is directed during near work. When we focus on near items, our gaze is directed both downward and inward, as each eye tends to converge nasally to better view the near item. This is in contrast to distance gaze where each eye is directed more horizontally and parallel to each other in order to better view the distant object. While the asymmetric aspects of this innovation do consider both the horizontal and vertical movement of the lower eyelid and worthy to consider in a translating lens design particularly as it relates to its impact to translation of the lens, additional opportunity still exists in this space.

In US Published Patent Application Number 2013/0258274, whose assignee is also the assignee of applicants' present invention, a lower eyelid contact surface and under-lid support structure is disclosed that suggests varying ramp shape configurations including both convex and concave curved portions. Applicants believe this is an important consideration as well, but US Published Patent Application Number 2013/0258274 does not consider these ramp shapes in combination with parametrization of the back radius of curvature, nor do they consider them in combination with several of the design elements of applicant's invention simultaneously and or holistically.

Lastly, in U.S. Pat. No. 6,241,355, the innovators use spline based mathematical surfaces without restrictions of rotational symmetry in order to enable the design and fabrication of contact lenses that have posterior surfaces that provide a good fit to corneas of complicated shapes. Although the general approach of fitting splines to ensure a smooth and continuous surface may be utilized in the present application, the innovators do not describe or consider the unique geometry and features of the present application in the '355 patent. Rather their primary purpose was to enable an improved fit to irregularly shaped corneas, such as those found in keratoconus patients.

The prior art devices described above, while representing a considerable improvement over older devices, employ features and designs resulting in certain tradeoffs, for example, and most relevant to applicant's invention, comfort versus the extent of translation and how this translation is achieved. Of the art discussed, while each attempts to address the issue from a specific aspect, they do so from unique perspectives rather than from a more holistic approach as is accomplished with the present application. Furthermore, even when one combines these prior art references, they do not provide the physical structure or relationship of the present application. Accordingly, there exists a need for a truncated translating contact lenses with improved on eye performance that takes into account the anatomy of the eye and the functioning of the eye-lids from multiple design considerations such as value and shape of thickness variations in combination with posterior radii variations while also maintaining a high degree of comfort when such a lens interacts with both the upper and lower eyelids. Having a lens that accomplishes this in combination with optimizing both far and near vision needs would be advantageous.

SUMMARY OF THE INVENTION

The contact lens in accordance with the present invention overcomes the disadvantages associated with the prior art as briefly described above by using design elements and features which improve comfort, maximize the extent of the relative translation of the lens and achieve high quality vision for both near and far vision requirements. In particular, in accordance with the present invention, this is achieved by the parametrization of the thickness variation; optimizing the shape of the thickness variation particularly in the inferior region of the lens while ensuring a smooth and continuous transition to all other regions of the lens to achieve improved comfort and eyelid interaction; and optimizing the back peripheral radius variation to maximize the extent of translation, as well as including an optional and alternate asymmetric aspect of the truncated translating lens design.

In accordance with one aspect, the present invention is directed to a truncated contact lens. The contact lens comprising an inner optic zone having at least both a first vision correction region, and a second vision correction region, the first vision correction region being superior in position to the second vision correction region and the first vision correction region configured for correcting far vision needs, the second vision correction region being inferior in position to the first vision correction region and configured for correcting near vision needs, an outer peripheral zone surrounding the inner optic zone and configured for providing maximum translation of the contact lens on eye; the outer peripheral zone having at least one lens parameter to be optimized to achieve maximum translation ability on eye while maintaining comfort, wherein said lens parameter is selected from the group consisting of a maximum lens thickness, a back curve radius of curvature having both a minimum and maximum radius of curvature, and a ramp shape.

In accordance with another aspect, the present invention is directed to a truncated contact lens. The contact lens comprising an inner optic zone having at least both a first vision correction region, and a second vision correction region, the first vision correction region being superior in position to the second vision correction region and configured for correcting far vision needs, the second vision correction region being inferior in position to the first vision correction region and configured for correcting near vision needs; an outer peripheral zone surrounding the inner optic zone and configured for providing maximum translation of the contact lens on eye; the outer peripheral zone having a back surface radius of curavature and a variable thickness variation wherein said variable thickness variation is 0.3 mm or less within the outer peripheral region.

In accordance with still another aspect, the present invention is directed to a truncated contact lens. The contact lens comprising an inner optic zone having at least both a first vision correction region, and a second vision correction region, the first vision correction region being superior in position to the second vision correction region and configured for correcting far vision needs, the second vision correction region being inferior in position to the first vision correction region and configured for correcting near vision needs; an outer peripheral zone surrounding the inner optic zone and configured for providing maximum translation of the contact lens on eye; the outer peripheral zone having a variable thickness variation wherein said variable thickness variation is 0.3 mm or less within the outer peripheral region and the outer peripheral zone further comprising an inferior portion, a superior portion, and an intervening transition portion located between the inferior and superior portions.

In accordance with yet still another aspect, the present invention is directed to a truncated contact lens. The contact lens comprising the lens comprising: an inner optic zone having at least both a first vision correction region, and a second vision correction region, the first vision correction region being superior in position to the second vision correction region and configured for correcting far vision needs, the second vision correction region being inferior in position to the first vision correction region and configured for correcting near vision needs; an outer peripheral zone surrounding the inner optic zone and configured for providing maximum translation of the contact lens on eye; the outer peripheral zone having a nonuniform back surface radius of curvature and a variable thickness variation wherein said variable thickness variation is 0.3 mm or less within the outer peripheral region and the outer peripheral region further comprises an inferior portion, a superior portion, and an intervening transition portion located between the inferior and superior portions wherein thickness variations and back surface radius of curvature changes are smooth and continuously blended throughout the peripheral region and further comprising a ramp portion having a maximum thickness and a ramp shape selected from the group consisting of concave, convex and linear shapes wherein said ramp portion is positioned such that the maximum thickness of the ramp portion is located within the inferior portion of the peripheral region.

In accordance with still another aspect, the present invention is directed to a method of designing a contact lens having a variable thickness variation of 0.3 mm or less. The method comprising selecting one or more optimizable lens parameters in order to maximize lens translation on eye, wherein said lens parameter is selected from the group consisting of a maximum lens thickness, a back curve radius of curvature having both a minimum and maximum radius of curvature, and a ramp shape; for each parameter determining the value of that parameter at both the inferior and superior positions along the vertical meridian; for each parameter determining the value of that parameter at the medial and lateral positions along the horizontal meridian; and selecting the values for each parameter along intervening locations between positions that result in a smooth and continuous geometry.

In accordance with one aspect of the present invention, the thickness variation of the peripheral region of the truncated lens is parametrized resulting in a minimum thickness in the superior region, and a maximum thickness in the inferior region, with the thickness changing between these two regions in accordance with a specified formula and being a result of the differences between the anterior and the posterior surfaces of the lens.

In accordance with another aspect one may also parametrize the back peripheral radius of curvature wherein the radius of curvature of the back peripheral radius is maximized or flatened in the superior region, while minimized or steepened in the inferior region, with the radius of curvature changing between these two regions in accordance with a specified formula.

In accordance with yet another aspect, the ramp shape, in the thickness dimension of the lens, particularly in the inferior portion of the lens, may be convex, concave, or linear in shape. By altering the type of shape or using combinations of the above shapes, one may change how the lens interacts with both the lower and upper eyelids both in terms of how effective and comfortable the interaction is to the wearer.

Maximum thickness and thickness variation as a result of combining two or more of these individual design elements or features may also be utilized to achieve the desired result of improved comfort and translation along with minimal impact to centration. In accordance with the present invention, one may also optionally achieve the above with a truncated or pseudo-truncated lens design and which may also be asymmetric relative to the vertical meridian of the lens. Each of these aspects may be used individually or in combination to optimize the geometry of the lens to maximize lens translation while maintaining comfort.

Applicants conducted simulation experiments on twenty-four design configurations and analyzed the interaction of these multiple variables as it relates to extent of translation and centration achieved. Each of the twenty four designs was evaluated on nineteen eyes with geometries characterized by Optical Coherence Tomography image processing of nineteen individuals. An assessment of lens parameters that impact comfort for each design configuration was also completed. After selection of two of the most promising designs from the initial twenty-four, ten additional variations of these two designs were also evaluated. Key parameters considered in the design variation included slope of change in thickness (from the superior to the inferior region), maximum thickness, peripheral back curve radius of curvature, back curve transition angle, and ramp shape. Based on the factorial analysis conducted upon the applicants' simulation results for the translation achieved by every design variation, peripheral back curve radius of curvature and maximum thickness were deemed to be the most influential factors related to translation, while results were somewhat insensitive to the extent of the back curve transition angle. Ramp shape tended to be more important from a comfort perspective whereas its impact on extent of translation was insignificant. Slope of the thickness variation from superior to inferior was also deemed to be not significant. But applicants' determined, how one transitions from the maximum thickness profile in the inferior region to the minimum thickness of the superior region is just as important as thickness itself from the upper eyelid comfort perspective. Furthermore, with larger variations of the peripheral back curves from the inferior to the superior regions of the lens, it was possible to achieve significantly increased translation of the lens allowing for reduction in the nominal thickness of the lens. This is important because a reduction in thickness correlates to improved overall comfort when the lens is worn on eye and to do so while achieving increased translation is a considerable advancement over the prior art.

In a preferred embodiment of the invention, the lens includes a central optical zone surrounded by a peripheral region. The optical zone may include multiple vision correction zones to address near and distance as well as intermediate vision needs. In accordance with the present invention, lens shape is truncated in the inferior portion and thus the lens edge is non-round in shape. The thickness variation in the peripheral region is configured to follow the truncated shape and ensures the lens translation (and centration) results in the proper vision correction zone being aligned with and substantially overlapping with the pupil of the wearer's eye when worn on eye and for each of the vision correction needs. The thickness variation itself is achieved in the peripheral region and thus does not impact the optics in the optical region of the lens, although consideration is given to ensure a smooth transition between the two regions. The thickness variation exists circumferentially in the peripheral region with the thickest portion of the lens being located inferiorly, and the thinnest portion superiorly. The thickness variation transitioning between these two locations is preferably symmetric about a vertical meridian as well as being a smooth and continuous transition between these two locations and said thickness variation is achieved by considering both the anterior and posterior surfaces of the lens in the peripheral regions. The radius of curvature of the back surface in the superior region is larger than that of the radius of curvature of the back surface in the inferior region. Applicants have found that this results in a posterior surface back curvature which allows for less resistance to vertical translation. This was achieved while also maintaining comfort and having minimal impact to lens centration.

In a distinct departure from true truncated lens designs which abut against the top portion of the lower lid, applicants truncated designs in accordance with the present invention, through both its parametrized thickness variation and use of ramp shapes results in a portion of the lens remaining and positioned under the lower eyelid to varying amounts while also retaining a non-round truncated shape. Both the extent and degree of thickness differential can impact the amount of the lens that resides under a portion of the lower lid. The convex, linear, and concave ramp shapes also allow for varying degrees of how much of the lens resides under the lower eye-lid and thus may have a direct impact to comfort. The concave ramp shape would achieve the greatest extent of under lid residency with the convex ramp shape achieving the least, while the linear ramp shape is between these two versions of ramp shapes. These ramp shapes allow for under lid residency for both the upper and lower eyelids to differing extents and may impact comfort differently as well given a spectrum of contact lens wearers whose sensitivities and eye geometries may differ. The selection of one ramp shape over that of another in addition to considering extent of under-lid residency requirements may preferably be accomplished by choosing the shape that best conforms to the shape of the lower eyelid. In an additional exemplary embodiment, the resulting maximum thickness and its impact to both translation and comfort may be optimized from one or more of the prior design elements of thickness variation, radius variation, and ramp shape. While minimizing the overall maximum thickness is paramount, the slope of thickness variation from its minimum value to its maximum value is also of importance. As one moves circumferentially either clockwise or counter-clockwise (at a fixed radial distance from center) being initially positioned in the thickest regions located inferiorly, and progresses to the thinnest region located superiorly, the maximum thickness gradually decreases formulaically (in a somewhat linear manner) over the course of this travel, resulting in a smooth transition between these two regions. This smooth transition over the entire peripheral region is one of the factors involved in maintaining improved comfort particularly in contrast to pseudo-truncated lens designs in the prior art which have fairly localized thick regions which may negatively impact comfort.

In a final embodiment or embodiments, while each of the previous exemplary embodiments described resulted in a thickness variation that was symmetric about a vertical meridian, the same design elements may be leveraged in a similar fashion to achieve improved results but with a resulting thickness variation that is asymmetric rather than symmetric about a vertical meridian. The purpose being in order to mimic and capitalize on the natural direction of gaze differences when one is looking at distant versus near objects. The contact lenses of the present invention may be utilized with diffractives or any type of contact lens optics without additional cost and optimized to improve clinical comfort and/or physiology.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 3A is a table illustrating the twenty-four design variations that were utilized in the initial parametric study on translation.

FIG. 3B is a table illustrating the ten additional design variations of designs #3 and #9 from the initial parametric study to perform a pairwise comparison.

FIGS. 4A and 4B are two representative contour plots and graphs showing thickness by radial distance for multiple meridians for two of the twenty-four design variations showing the resulting maximum thickness of the lens.

FIGS. 5A and 5B provide respective translation and centration results for the original twenty-four designs along with the control design.

DETAILED DESCRIPTION OF THE PREFERRED EMBODIMENTS

Figure 1A:
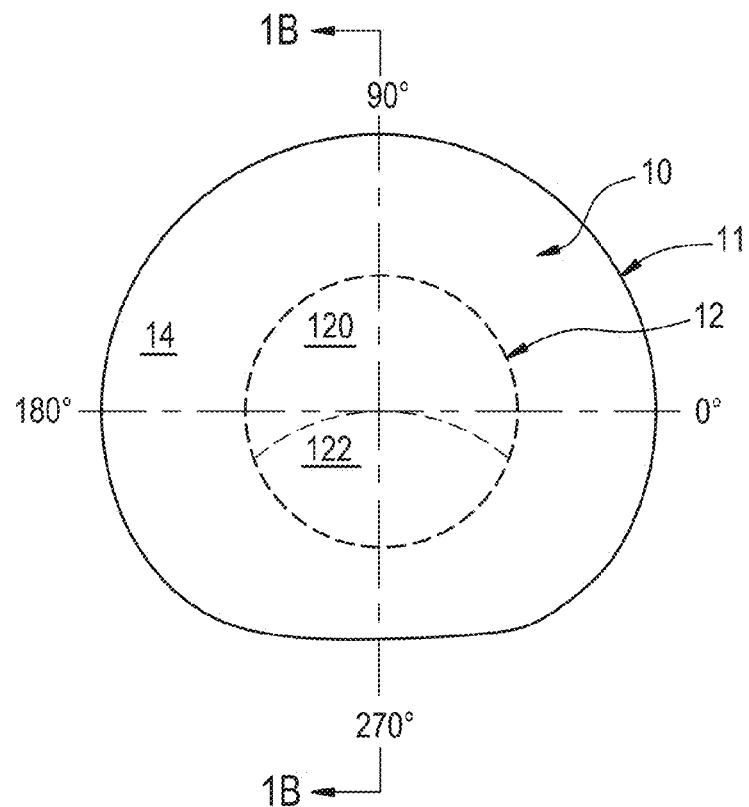
FIGS. 1A and 1B provide a front view and side view of a contact lens showing the representative regions of interest in accordance with the present invention.

For purposes of the present invention a contact lens 10 as shown in FIG. 1A is defined by at least two distinct regions. The inner or optical region 12 from which the vision correction is obtained, and the outer or peripheral region 14 that provides mechanical stability of the contact lens 10 on eye, and is bordered by lens edge 11, wherein the peripheral region 14 surrounds the optical region 12. An optional intermediate region (not shown) between the inner or optical region 12 and the outer or peripheral region 14 may be present and is used for blending the two aforementioned regions in a smooth manner such that abrupt discontinuities do not occur. In some exemplary embodiments this intermediate region may not be required. More specifically, the optional intermediate region (not shown) ensures that the optical region and the peripheral region are blended smoothly. It is important to note that both the optical region 12 and the peripheral region 14 may be designed independently, though sometimes their designs are strongly related when particular requirements are necessary. For example, the design of a toric lens with an astigmatic optical region might require a particular peripheral region for maintaining the contact lens at a predetermined orientation on the eye.

The inner or optical region 12 provides vision correction and in accordance with the present invention is designed to provide at a minimum both near and far vision correction. Thus inner or optical region 12 has at least two vision correction zones, both a distance vision correction zone 120 located superiorly and a near vision correction zone 122 located inferiorly. Both vision correction zones 120 and 122 are contained within the boundaries of inner or optical region 12. In some exemplary embodiments, an additional intermediate vision correction zone 121 as shown in FIG. 1J may be positioned below distance vision correction zone 120 and above near vision correction zone 122 and also located within inner or optical region 12 to provide for intermediate vision correction for tasks such as working on a computer. The outer or peripheral region 14 provides for basic fit and stabilization of the contact lens on the eye including, centration and orientation as well as improved translation in accordance with the present invention. As it relates to applicants' invention, the entirety of the peripheral region may be leveraged to improve translation while maintaining comfort. Specifically the superior and inferior locations as well as the lateral locations of the peripheral region provide opportunities for design elements/features to be designed location specific.

Figure 1B:
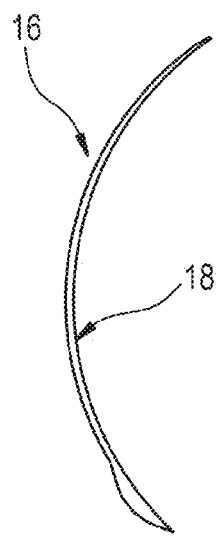

For purposes of the present invention a contact lens is also defined by a front surface 16, a back surface or base curve 18 as shown in FIG. 1B which provides a cross-sectional representation of lens 10. Lens thickness is an important variable which is optimizable and may be determined in any of the regions, but preferably in the outer or peripheral region 14 by simply measuring the radial distance between the back surface 18 and front surface 16 when the lens is positioned horizontally at a specified radial distance from center and along a specified angular meridian. The lens thickness is a result of several important parameters, such as lens back surface radius of curvature, ramp shape, slope of thickness variation from the superior to inferior regions and lens edge geometry.

Figure 1C:
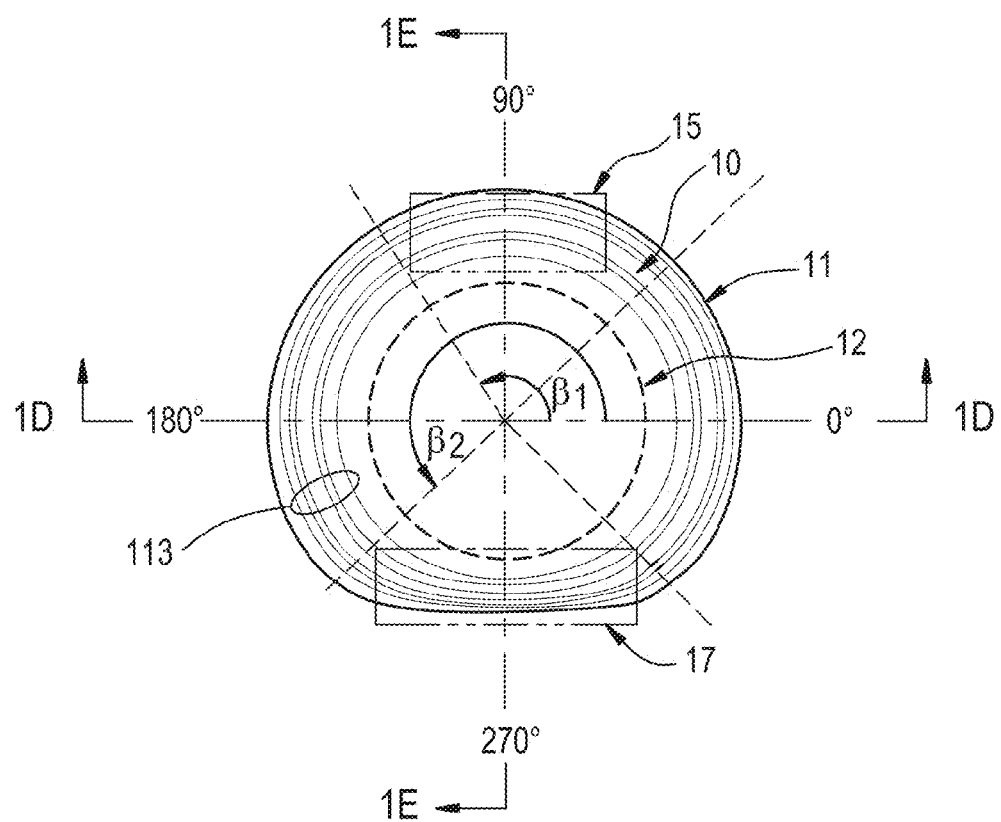
FIGS. 1C, 1D and 1E provide a front view and two sectional views respectively of a contact lens showing the representative regions of interest as it relates to the parametrized thickness and radius of curvature variation in accordance with the present invention.

The minimum lens thickness occurs superiorly in the peripheral region indicated in FIG. 1C by the area mainly bounded and marked as 15. The maximum lens thickness occurs inferiorly in the peripheral region, indicated in FIG. 1C by the area mainly bounded and marked as 17. Also shown in FIG. 1C are dashed lines representing the horizontal and vertical meridians of the lens. The horizontal meridian being the horizontal line aligned with the 0 and 180 degrees indications, while the vertical meridian being the vertical line aligned with the 90 and 270 degrees indications.

The set of somewhat substantially circumferential path lines 113, shown in FIG. 1C are used to define the contour of the lens surface. The resulting lens thickness along each circumferential path changes in a smooth and continuous manner from maximum to minimum as one moves circumferentially from the thickest portion in area 17 at an angular location of 270 degrees to the thinnest portion in area 15 at an angular location of 90 degrees and the thickness at a location along this circumferential path can be defined by the equation 1 below:

$$T = T^{min} + (T^{max} - T^{min})\cos\left(\frac{\pi}{2}\frac{(y - y_{max})}{(y_{min} - y_{max})}\right)^{\alpha} \quad \text{Eq. 1}$$

where: T=thickness,
$T^{min}$=Minimum thickness,
$T^{max}$=Maximum thickness,
y=vertical distance from horizontal axis,
$y_{min}$=location of minimum thickness along the vertical axis,
$y_{max}$=location of maximum thickness along the vertical axis, and
α=slope parameter defining the rate of thickness variation between minimum to maximum values.

As stated previously the set of somewhat concentric curves shown within the peripheral region in FIG. 1C equate to representative circumferential paths whose thickness is defined by equation 1 at differing radial distances in accordance with the present invention. While the equation results in a smooth and continuous transition from one thickness to the next as one follows any one of the representative circumferential paths, there is an additional requirement of a smooth and continuous transition from one thickness to the next as one moves radially from one position to an adjacent or adjoining position on an adjacent circumferential path. Thus the resulting surface and thickness is defined by the control points along the individual representative circumferential paths, and then by fitting a higher order curve through each set of the control points of the individual circumferential paths to that of the set of control points of the adjacent circumferential paths.

Figure 1D:
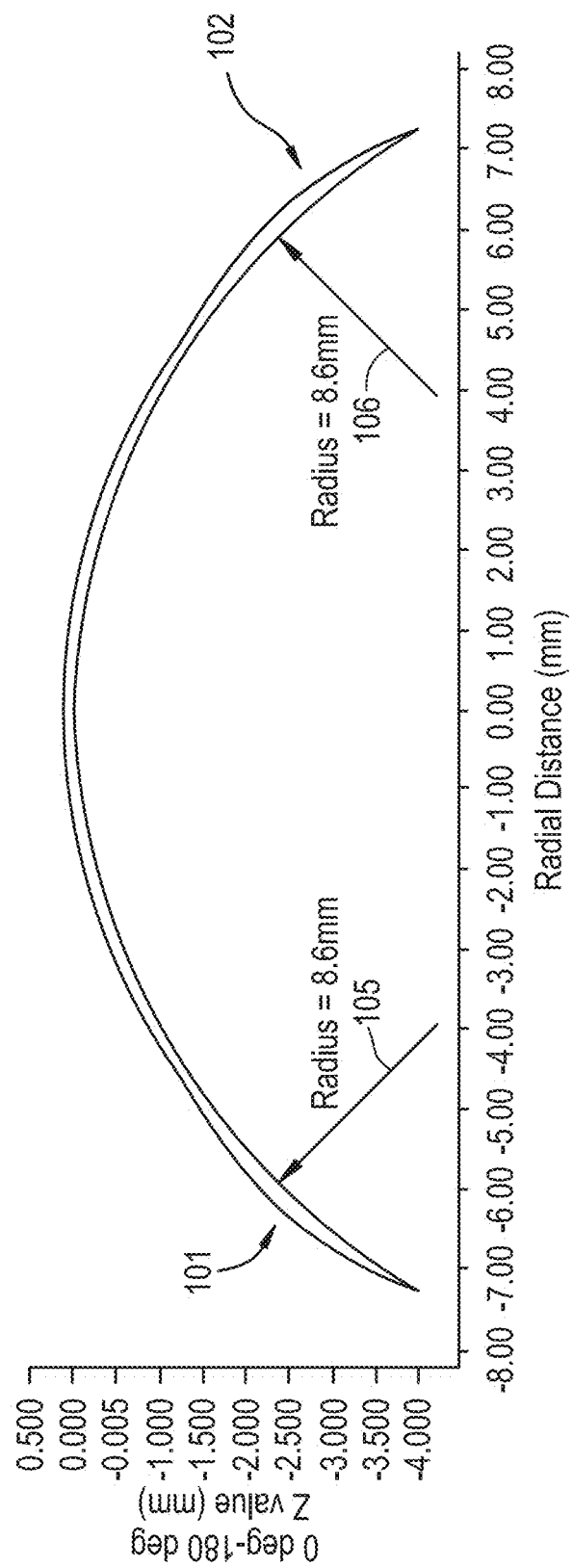
Figure 1E:
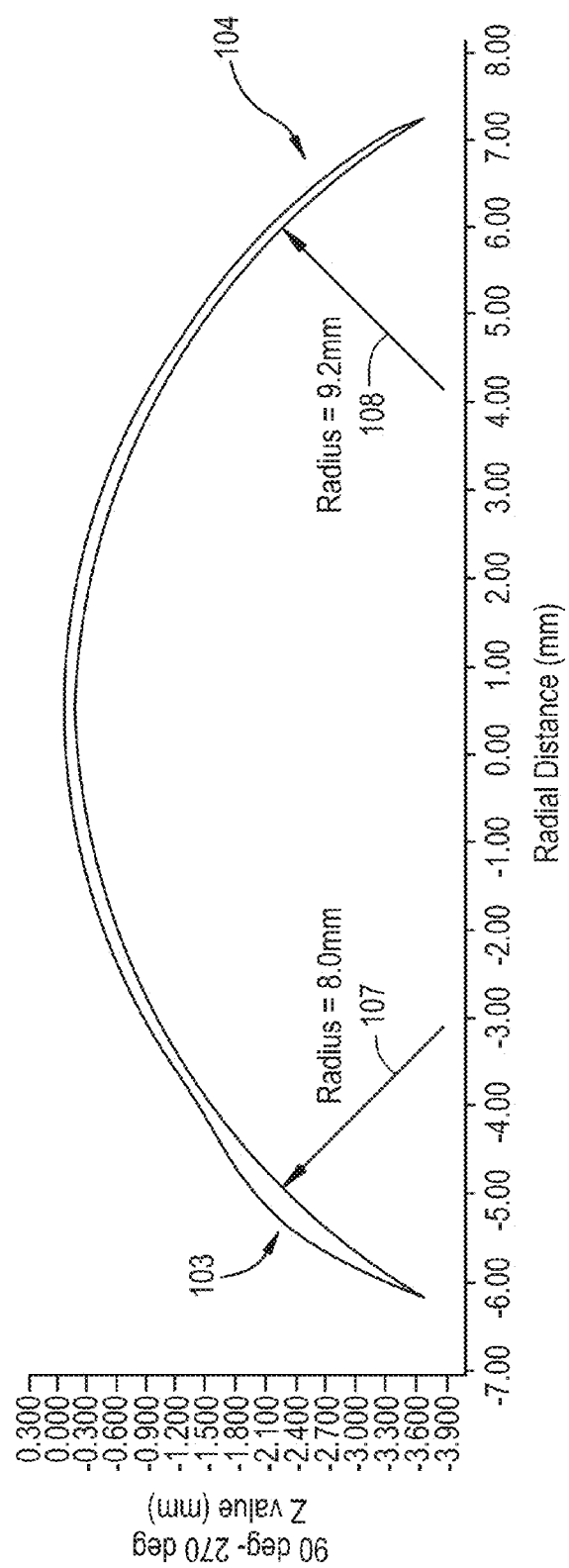

Sectional views along the horizontal and vertical meridians as shown in FIGS. 1D and 1E are instructive how this is achieved and show the result of this transition, in that it is indeed smooth and continuous in the radial dimension as well as the circumferential dimension, which ensures comfort is maintained. As shown in FIG. 1D, which represents a sectional view along the horizontal meridian, we see that the two thickened areas 101 and 102 laterally located in the peripheral region, and the back surface radii of curvature 105 and 106, are both equivalent and symmetric relative to the vertical meridian. This is in contrast to the sectional view along the vertical meridian shown in FIG. 1E wherein the inferior thickened area 103 in the peripheral region is substantially thicker than the thickened area 104 in the superior portion of the peripheral region and thus asymmetric. In addition, as shown in FIG. 1E, the radius of curvature of the back surface 107 in the inferior portion of the back surface is smaller than that of the radius of curvature of the back surface 108 in the superior portion of the back surface making the back surface radius of curvature asymmetric as well. Furthermore, in comparing these two sectional views to each other, we see that the thickened region 103 located inferiorly, is thicker than the two thick regions 101 and 102 which are equivalent to each other in thickness, and both 101 and 102 are thicker than the region 104 located superiorly. Likewise, the smallest radius of curvature of the back surface 107 located inferiorly is aligned with the vertical meridian and is smaller than radii of curvatures 105 and 106 which are laterally positioned in the peripheral region and are equivalent and located along the horizontal meridian, and these radii of curvatures 105 and 106 are smaller than the largest radius of curvature 108 which is located superiorly on the back surface along the vertical meridian. The maximum back curve radius of curvature is constant in the superior region 15 and then smoothly transitions to the lateral back surface radii of curvatures.

The extent of this superior region which is symmetric relative to the vertical meridian can be specified by angle $\beta_1$ as shown in FIG. 1C. Likewise, the minimum back curve radius of curvature is constant in the inferior region 17 and then smoothly transitions to the lateral back surface radii of curvatures. The extent of this inferior region which is independently symmetric with respect to the vertical meridian can be specified by angle $\beta_2$ also shown in FIG. 1C. The angular superior 15 and inferior 17 regions specified by angles $\beta_1$ and $\beta_2$ when unequal result in an asymmetric variation of the back surface radius of curvature with respect to the horizontal meridian while still being symmetric with respect to the vertical meridian. When the resulting superior 15 and inferior 17 regions are equal, as specified by angles $\beta_1$ and $\beta_2$, which is the preferred embodiment, this results in making tooling and ultimately manufacture of the lens less expensive and less complicated, as well as resulting in a symmetric variation of the back surface radius of curvature with respect to both the horizontal and vertical meridians.

While the two radii of curvatures ($R^{max}$ and $R^{min}$) are constant in each of the respective regions 15 and 17, the resulting radius of curvature variation (r) of the back surface in the intervening transition zones may be defined by equation 2 below in order to ensure a smooth and continuous transition from $R^{max}$ to $R^{min}$, where r is given by $$r = R^{min} + (R^{max} - R^{min})\sin\left(\frac{\pi}{2}\frac{(\theta - \beta_2)}{(\beta_2 - \beta_1)}\right)^{2} \quad \text{Eq. 2}$$

where: r=radius of curvature,
$R^{min}$=minimum radius of curvature,
$R^{max}$=maximum radius of curvature,
θ=angle from horizontal meridian to meridian of interest should be between $\beta_1$ and $\beta_2$,
$\beta_1$=angular extent of superior (Rmax) region from horizontal meridian, and
$\beta_2$=angular extent of inferior (Rmin) region from horizontal meridian.

Figure 1F:
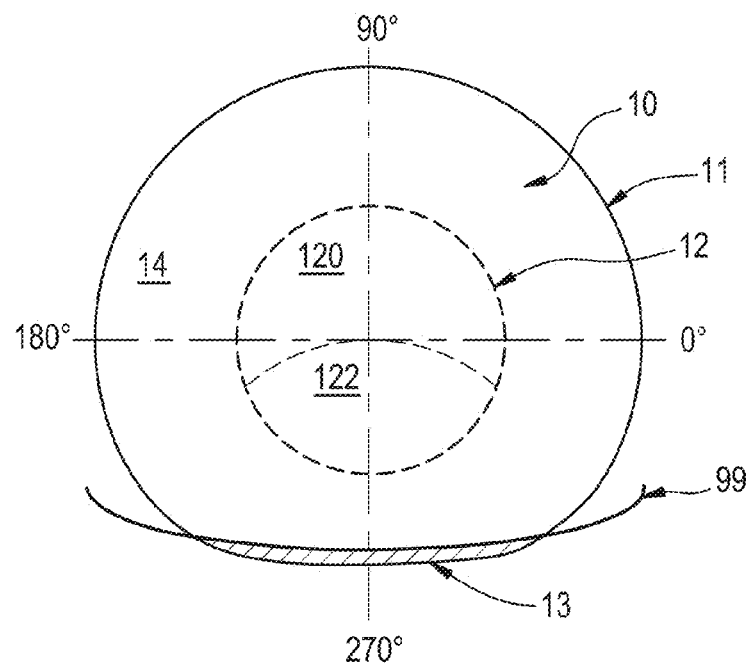
FIGS. 1F and 1G, show a front view and a cross-sectional side view of the contact lens and how it interacts with the outline of a representative lower eye-lid shape in accordance with the present invention.
Figure 1G:
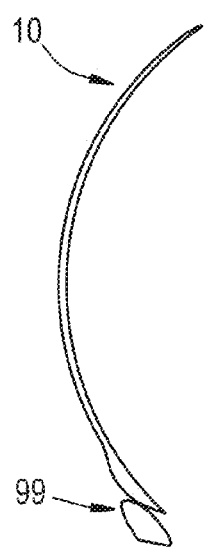

As shown in FIG. 1F the lens edge 11 is the rim of the contact lens 10, and is another useful variable to consider in an optimization scheme. For the purpose of the present invention, the shape of the edge 11 as viewed from the top is truncated inferiorly and as such is non-circular. The truncated portion is preferably located inferiorly and symmetric to the vertical meridian and may approximate the shape of the lower eye-lid 99 as shown in FIG. 1G, for which it is designed to interact with in accordance with the present invention. The inferior conforming shape portion of the lens edge when viewed from the front as shown in FIG. 1F is neither flat nor round, but rather a second order curve that approximates the anatomical shape of the lower lid for which the lens interacts with. Additionally the resulting thickness of the lens is a function of multiple variables including but not limited to the parametrized back surface radii as well the front surface geometry and one of the three ramp shapes utilized, and unlike more conventional truncated lens designs in accordance with applicant's invention, a portion of the inferior portion of the lens remains resident under the portion of the lower eyelid 99 as shown in both FIGS. 1F and 1G. The portion of the lens under the lower lid is represented as the cross hatched region 13 shown in FIG. 1F.

Figure 1H:
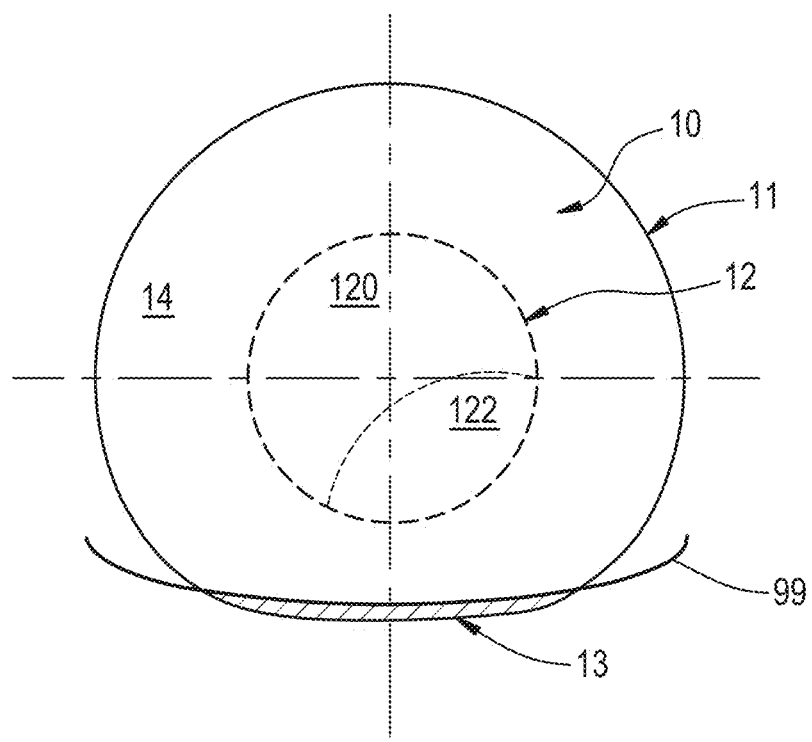
FIG. 1H, shows a front view of the alternate asymmetric variation of the optic zones of a contact lens in accordance with the present invention.
Figure 1J:
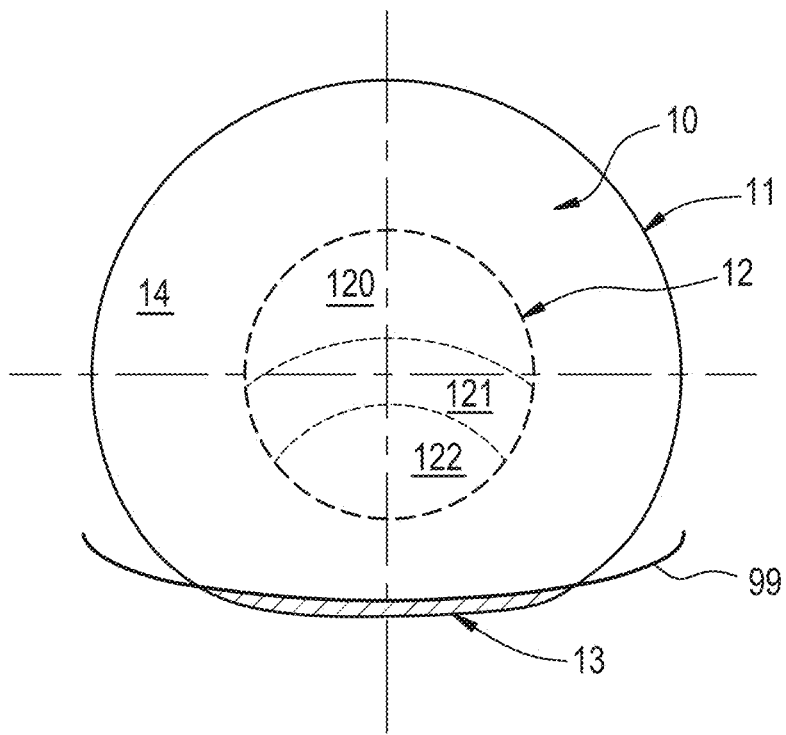
FIG. 1J, shows a front view of the contact lens with an additional intermediate optical zone in accordance with the present invention.

In an alternate exemplary embodiment, one can provide both right and left lenses with an asymmetric optical region relative to the vertically symmetric truncated lens edge as shown in FIG. 1H. Here vision correction zone 122 for near in optical region 12 is positioned with a nasal bias to address near vision correction needs. As such this embodiment would require both right and left versions of the lens.

In yet another exemplary embodiment, optical region 12 may have additional vision correction zones included. FIG. 1J shows optical region 12, having three vision correction zones. As previously described, this includes vision correction zone 120 for distance, and vision correction zone 122 for near, and positioned between these two vision correction zones is an additional intermediate vision correction zone 121 for intermediate vision correction needs such as viewing items such as a computer screen. Additional zones or changing zone shape or size are only limited by the available area in the optical region 12.

Figure 2B:
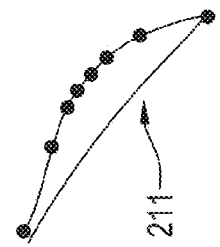
FIGS. 2A, 2B, 2C and 2D, provide a front view and three detailed sectional views respectively of a contact lens showing the representative regions of interest as it relates to the parametrized ramp shape in accordance with the present invention.
Figure 2C:
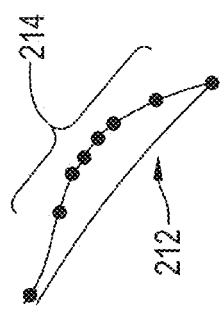
Figure 2D:
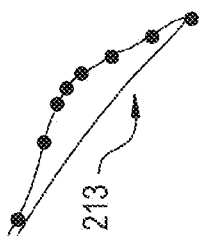
Figure 2A:
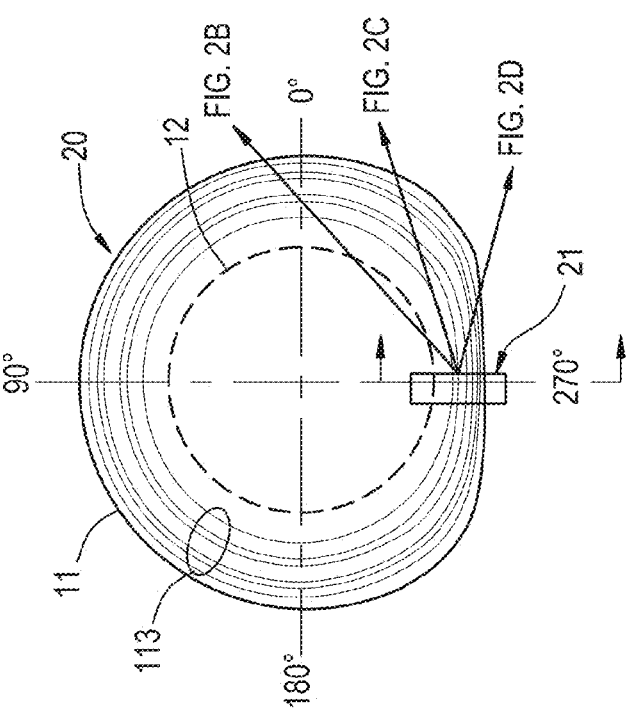

In addition to thickness and shape variation as well as back surface radius of curvature variation, the choice of the ramp shape is an important consideration not only for achieving translation, but for ensuring comfort when the lower eyelids interact with the lens itself. As shown in FIG. 2A, and specifically cross sectional views 2B, 2C and 2D, the various ramp shapes developed and evaluated include convex, linear and concave ramp shapes. While ramp shape is an important consideration, particularly for comfort, it is important throughout the whole peripheral region, not just the most inferior portion indicated as focus region 21 in FIG. 2A.

In accordance with applicant's invention, the ramp shape is utilized throughout the peripheral region of the lens 20. As shown in FIG. 2A, a set of circumferential paths 113 is shown on the lens surface. These circumferential paths are used to define the contour of the lens surface. The six interior control points 214 on the front surface shown in each of the detail views in FIGS. 2B, 2C and 2D, correspond to a location for each of the circumferential paths shown in FIG. 2A. The additional two control points shown in each of FIGS. 2B, 2C and 2D correlate to corresponding positions on the lens edge 11, and on the margin of the optical region 12. The ramp shape utilized is both continuous and smooth as one progresses both circumferentially and radially around the lens, but the maximum thickness is different around this circumferential path in a similar fashion as previously described with the thickness variation. Similar to the thickness variation, the thickest ramp shape will be located inferiorly in the peripheral region, see focus region 21 in FIG. 2A. Each of the detail views shown in FIGS. 2B, 2C and 2D show the cross-sectional shape of the lens in this inferior peripheral region (ie: 270 degree location). The ramp shape utilized in the lens may be one of three configurations, or in an alternative embodiment, a combination of two or more shapes thus altering the shape as one moves from an inferior circumferential position to other positions on the lens, although a single ramp shape along the entire circumference is preferred.

These three variations of ramp shape are represented in FIGS. 2B, 2C and 2D. Ramp shape 211 is convex on the anterior surface, the convex portion being inferiorly located on the ramp portion on the lens as shown in FIG. 2B, and due to its convex shape results in the least amount of area that remains under the lid. In FIG. 2C, ramp shape 212 is linear on the anterior surface, also inferiorly located and allows for an increase amount of area of the lens to remain resident under the lid as compared to convex shape 211. Ramp shape 213 is concave on the anterior surface, and its concave shape also being inferiorly located on the lens as shown in FIG. 2D. Ramp shape 213 has the greatest extent of the lens remaining resident under the lid as compared to ramp shape 211 and 212. In addition to the differences of under lid residency of the lens due to ramp shape, the ramp shape itself and how it interacts with the lid with its varying extent of conforming to lid geometry may influence comfort. Ramp shape 213 as compared to the other ramps shapes is preferred as having the greatest positive impact to comfort without impacting extent of lens translation achieved, however other ramps shape variations (linear and convex) can also be used as these did not have significant impact on translation, and in certain situations may be more comfortable for certain eye lid geometries.

FIG. 3A is a table which provides detailed specifications of the initial twenty four design configurations evaluated. Initial parameters included: two maximum thickness values of 0.4 mm and 0.6 mm; peripheral back curve radius of curvature variations ranging from a $R_{min}$ of 8.0 mm to a $R_{max}$ of 9.2 mm and a $R_{min}$ of 8.4 mm to a $R_{max}$ of 8.8 mm; sets of back curve transition angles of $\beta_1=120$; $\beta_2=240$ degrees and of $\beta_1=150$; $\beta_2=210$ degrees; and ramp shapes in the peripheral portion having either a convex, linear or concave geometry in the peripheral portion on the anterior surface. These parameters were combined to evaluate all permutations of these parameters to determine the combined impact of each parameter resulting in twenty four configurations to be assessed.

FIG. 3B is a table showing the design specifications for ten additional variations of design #3 and design #9. All new additional design variations evaluated utilized a back curve transition angles of $\beta_1=120$; $\beta_2=240$ degrees, and a concave ramp shape. As the table indicates, the first two new variations #25 and #26, have a slope parameter α of 2.27 and a maximum thickness of 0.3 mm, reduced from 0.4 mm of the initial designs of #3 and #9 respectively. The next three variations of design #3, maintain a slope parameter α of 2.27, and a maximum thickness of 0.4 mm but use one of three uniform back curve radii (8.4 mm for new variation #27, 8.8 mm for new variation #28 and 9.2 mm for new variation #29). Design variation #30 is a modification to the original control (TRS156). While the next two design variations #31 and #32, modify the superior to inferior slope parameter of design #3 to 1.0 and 6.0 respectively, holding maximum thickness at 0.4 mm and $R_{min}$ at 8.4 mm. The final two variations are similar to the previous two, but modify the superior to inferior slope parameter of design #9 to 1.0 and 6.0 respectively, holding the maximum thickness at 0.4 mm and $R_{min}$ at 8.0.

FIGS. 4A and 4B, show the resulting thickness in the form of both a contour plot and a XY graph showing the relative thickness of these two representative samples. The two designs represented have similar peripheral back curve radius of curvature variations, and back curve transition angle and both have a convex ramp shape, but lens 41 in FIG. 4A, has a maximum thickness of 0.4 mm, while lens 42 in FIG. 4B has a maximum thickness of 0.6 mm.

Figure 6:
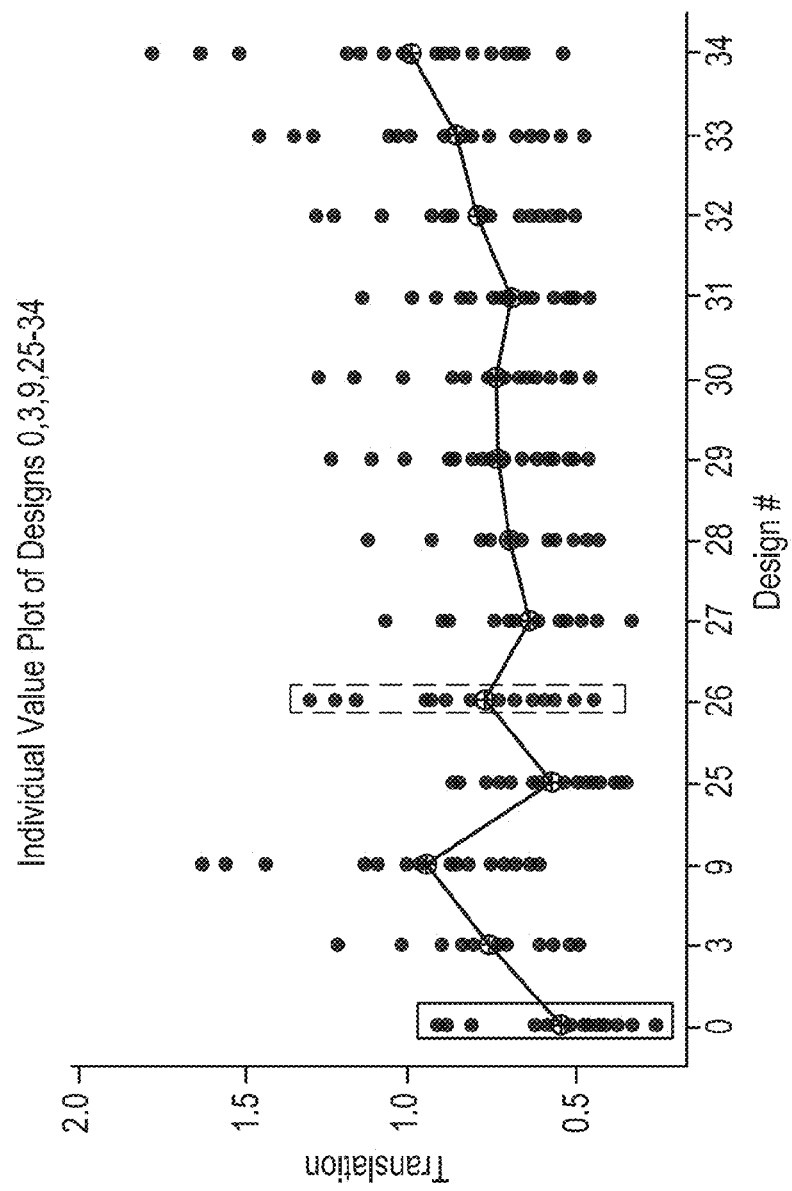
FIG. 6 provides translation results for the two of the original twenty-four designs as well as the additional ten variations along with the control design.

FIG. 5A provides the translation results for the initial 24 configurations along with a control lens indicated as design #0. In this case lenses #3 and #9 were the two variants of the original twenty four that were chosen for additional study. FIG. 5B shows the centration results for these initial 24 configurations compared to the control lens (#0), indicating that for the chosen lens designs, impact to centration was within acceptable ranges. Upon evaluation of the translation results, lens designs #3 and #9, along with the control lens were chosen for additional investigation. An additional ten lens variants of designs #3 and #9 and the control (see FIG. 3B), were further evaluated for lens translation. FIG. 6 provides the resulting lens translation for the chosen lenses.

While many of the design decisions and choices will result in a trade-off, applicants have found that as a result of this very comprehensive evaluation, base curve transition angle and ramp shape are not as impactful to lens translation as some of the other variables considered, but ramp shape is important to comfort. In addition base curve and thickness are the most influential factors on translation based upon the factorial analysis conducted. Furthermore, by adjusting the base curve to compensate for lower thickness, it will result in increasing comfort of the lens when on eye. Specifically, applicants have determined that the low thickness variation of 0.3 mm achieves significantly higher translation values than the control device (design #0). In assessing slopes, for design variations #33 & #34 (variations of #9) and design variations #31 & #32 (variations of #3) it was determined that there was no difference in the choice of medium, high or low superior to inferior slopes. As it relates to a back surface radius of curvature variation versus a uniform back surface radius of curvature, it was found that for moderate ($R_{min}$=8.4 mm to $R_{max}$=8.8 mm) back surface radius of curvature variation, the variation to a uniform back curve radius of curvature was insignificant. However when evaluating the back surface radius of curvature variation versus an uniform back surface radius of curvature for when the variation is greater ($R_{min}$=8.0 mm to $R_{max}$=9.2 mm) it was found that the presence of variational back surface radius of curvature is significantly different and beneficial as compared to an uniform back surface radius of curvature. Thus applicants have determined the optimal combination of factors to maximize translation while ensuring comfort is not sacrificed or adversely impacted.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A truncated translating contact lens, the lens comprising:
   an inner optic zone having at least both a first vision correction region, and a second vision correction region, the first vision correction region being superior in position to the second vision correction region and the first vision correction region configured for correcting far vision needs, the second vision correction region being inferior in position to the first vision correction region and configured for correcting near vision needs when the contact lens is on eye;
   an outer peripheral zone surrounding the inner optic zone and configured for providing maximum translation of the contact lens on eye, wherein the contact lens comprises an anterior surface, a posterior surface, a back curve and a front curve, a variable thickness of 0.3 mm or less, a variation in back curve radius wherein the radius of curvature of a back curve surface of the posterior surface in a superior region of the contact lens when on eye is larger than that of the radius of curvature of the back curve radius of the posterior surface in an inferior region of the contact lens when on eye, and the value of this variation is 0.4 mm or greater, a ramp shape with a thickness wherein the ramp shape is selected from the group consisting of either concave, convex or linear on the anterior surface and the thickness of the ramp shape is thickest at the inferior portion of the contact lens.

2. The contact lens according to claim 1 wherein the second vision correction region of the inner optic zone is positioned with a nasal bias relative to the positioning of the first vision correction zone resulting in the inner optic zone being asymmetric about a vertical meridian of the contact lens.

3. The contact lens according to claim 1 in which the inner optic zone has a third vision correction region positioned between the first vision correction region and the second vision correction region wherein the third vision correction region is configured for correcting intermediate vision needs.

* * * * *